*F. A. Hill,*
*Gang Plow*
No. 94,491. Patented Sep. 7, 1869.
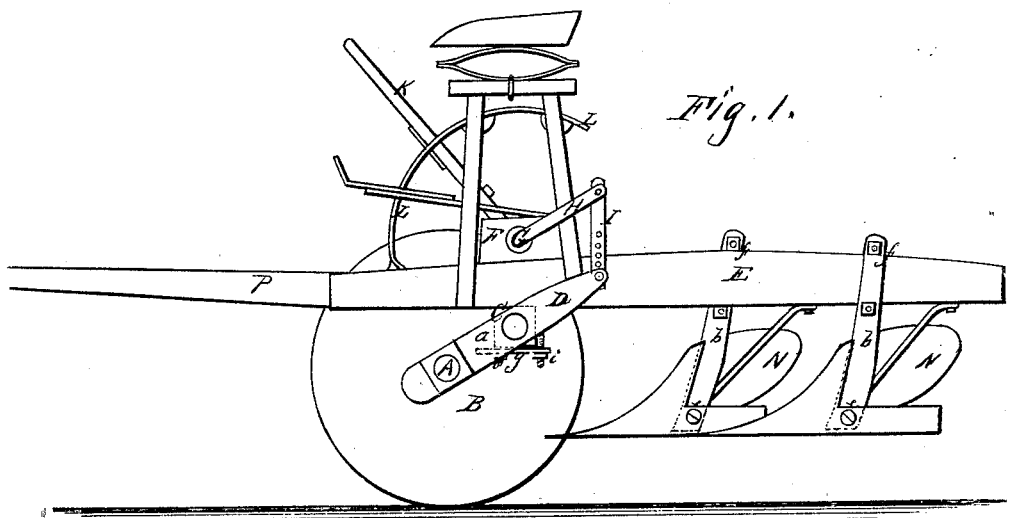
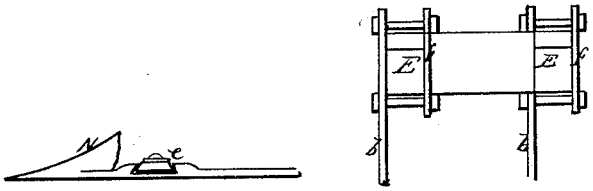
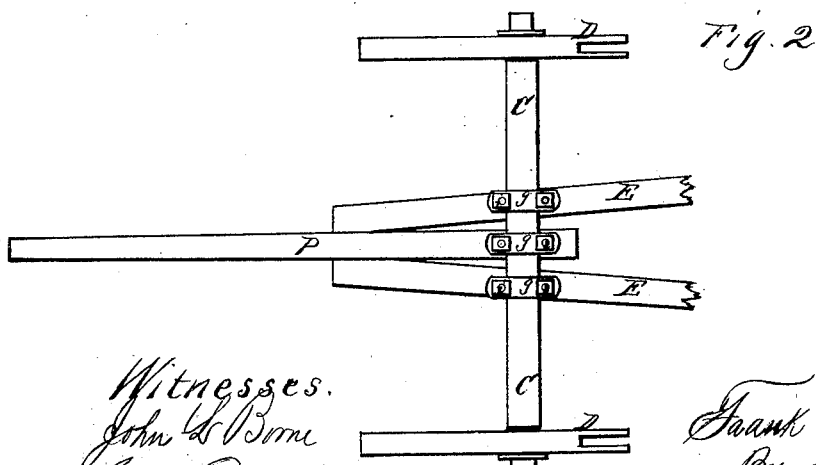
Witnesses.
John L. Borne
George Spaulding
Inventor.
Frank A. Hill
By Dewey & Co.
His Attorneys

United States Patent Office.

FRANK A. HILL, OF MARYSVILLE, CALIFORNIA.

Letters Patent No. 94,491, dated September 7, 1869.

IMPROVEMENT IN GANG-PLOWS.

The Schedule referred to in these Letters Patent and making part of the same.

To all whom it may concern:

Be it known that I, FRANK A. HILL, of Marysville, county of Yuba, State of California, have invented an improved Gang-Plow; and I do hereby declare the following description and accompanying drawings are sufficient to enable any person skilled in the art or science to which it most nearly appertains, to make and use my said invention or improvement, without further invention or experiment.

My invention relates to gang-plows; and consists, first, in an improved arrangement of levers for raising and lowering the frame on the axle, so as to throw the plows in or out of the ground; second, in an improved manner of attaching the upright standard, which connects the plows with the frame to the landside, so as to secure strength and stability; and, third, in the attachment of the pole to the axle, so that its direction and position can be changed when desired.

Referring to the accompanying drawings for a better explanation and description of my invention—

Figure 1 is a side elevation.

Figure 2 is a bottom view, showing the pole and frame attachment to the cross-bar.

A is the axle, upon which the wheels B revolve.

These axles are bent at right angles, so as to form cranks, which are attached to a cross-bar, C, in such a manner as to turn independent of it.

The arms $a$ of the cranks extend beyond their point of attachment to the bar C, so as to form arms D, to which the levers for raising and lowering the frame are connected.

The timbers E E are secured to the cross-bar C, and carry the plows N at their rear ends.

Secured on the top of the timbers E E, and directly over the cross-bar C, are boxes F F, in which a shaft, G, turns.

The ends of this shaft are bent at right angles, forming levers H H, the ends of which are connected with the extended arm D of the crank by a rod or bar, I.

The sweep or hand-lever K is attached to the shaft G at any convenient point, by moving which the shaft is rotated, thus raising and lowering the frame by changing the position of the cranks, the sweep being held at any desired point in a circular rack, L.

The vertical standards $b$, which connect the plows N to the frame, are made of wrought-iron, and are dovetailed into the landside, as shown at $e$, the opposite end being secured to the beam above, by means of a strap, $f$, placed on the opposite side of the beam, the two being bolted together above and below, thus uniting the whole together with great firmness.

The timbers E E and the rear end of the pole P are secured to the cross-bar C, by means of a bar of iron, $g$, placed on the under side of the cross-bar, a bolt, $i$, passing upward on each side through the timbers and pole. By this means, the frame or pole can be shifted as desired, to make the plows take more or less land.

By the use of the bent shaft G, and attaching the sweep to it, an immense leverage-power is obtained, by means of which the plows and frame can be raised with great ease. The plow, in all its parts, is light and strong, and can be easily adjusted to suit any kind of plowing required.

Having thus described my invention,

What I claim, and desire to secure by Letters Patent, is—

1. In combination with the extended arms D of the crank, and connecting-bars I, the bent shaft G, turning in boxes F F, said shaft being rotated by a sweep, K, substantially as and for the purpose above described.

2. The wrought-iron vertical standard $b$, dovetailed into the landside of the plow, substantially as and for the purpose above described.

3. Securing the timbers E and pole P to the cross-bar C, by means of the iron bar $g$ and bolts $i$, so that they may be adjustable, substantially as set forth.

In witness whereof, I have hereunto set my hand and seal.

FRANK A. HILL. [L. S.]

Witnesses:
G. R. WIGHTINGIN,
WM. SINGER.